(12) United States Patent
Sahara et al.

(10) Patent No.: US 10,499,395 B2
(45) Date of Patent: Dec. 3, 2019

(54) COMMUNICATION SYSTEM, BASE STATION, AND COMMUNICATION CONTROL METHOD

(71) Applicant: KYOCERA Corporation, Kyoto-shi, Kyoto (JP)

(72) Inventors: Toru Sahara, Yokohama (JP); Toshinori Iinuma, Kawasaki (JP)

(73) Assignee: KYOCERA CORPORATION, Kyoto (JP)

( * ) Notice: Subject to any disclaimer, the term of this patent is extended or adjusted under 35 U.S.C. 154(b) by 214 days.

(21) Appl. No.: 14/894,493

(22) PCT Filed: May 29, 2014

(86) PCT No.: PCT/JP2014/002857
§ 371 (c)(1),
(2) Date: Nov. 27, 2015

(87) PCT Pub. No.: WO2014/192305
PCT Pub. Date: Dec. 4, 2014

(65) Prior Publication Data
US 2016/0119926 A1    Apr. 28, 2016

(30) Foreign Application Priority Data

May 29, 2013 (JP) ................... 2013-113118
May 29, 2013 (JP) ................... 2013-113174

(51) Int. Cl.
*H04W 72/04* (2009.01)
*H04L 5/00* (2006.01)

(52) U.S. Cl.
CPC ....... *H04W 72/0453* (2013.01); *H04L 5/0048* (2013.01)

(58) Field of Classification Search
CPC ................................................ H04W 72/0453
See application file for complete search history.

(56) References Cited

U.S. PATENT DOCUMENTS

2002/0177444 A1* 11/2002 Nagato ............ H04M 15/8044
455/446
2008/0009280 A1    1/2008 Ushiki et al.
(Continued)

FOREIGN PATENT DOCUMENTS

JP    2008-17318 A    1/2008
JP    2011-101122 A    5/2011
(Continued)

OTHER PUBLICATIONS

International Search Report dated Sep. 2, 2014, corresponding to International Patent Application No. PCT/JP2014/002857.
Written Opinion of International Searching Authority dated Sep. 2, 2014, corresponding to International Application No. PCT/JP2014/002857, for which an explanation of relevance is attached.
3GPP TS 36.101 Ver. 9.0.0 "LTE; Evolved Universal Terrestrial Radio Access (E-UTRA); User Equipment (UE) radio transmission and reception" (Jun. 2009).
3GPP TS 36.211 Ver. 9.0.0 "LTE; Evolved Universal Terrestrial Radio Access (E-UTRA); Physical channels and modulation" (Dec. 2009).

* cited by examiner

*Primary Examiner* — Jeffrey M Rutkowski
*Assistant Examiner* — Basil Ma
(74) *Attorney, Agent, or Firm* — Hauptman Ham, LLP

(57) ABSTRACT

A communication system having a plurality of base stations for carrying out radio communication by arranging a plurality of carriers each taking a first frequency bandwidth in a second frequency band that is predetermined and to be exceeded by the carriers arranged in succession, wherein the communication system arranges the carriers in the second frequency band in such a manner that each of the carriers has an overlapping portion overlapping with each other, and a first base station for using a carrier A, one of the carriers having the overlapping portion, preferentially uses, over a second base station for using a carrier B, a radio resource of a part of the overlapping portion in assigning user data.

15 Claims, 10 Drawing Sheets

(56) References Cited

U.S. PATENT DOCUMENTS

| | | | |
|---|---|---|---|
| 2012/0002632 A1* | 1/2012 | Takagi | H04W 72/0426 370/329 |
| 2012/0039268 A1* | 2/2012 | Hakkinen | H04L 5/001 370/329 |
| 2012/0087250 A1* | 4/2012 | Song | H04W 24/02 370/242 |
| 2013/0089048 A1* | 4/2013 | Damnjanovic | H04L 5/001 370/329 |
| 2013/0259022 A1 | 10/2013 | Jitsukawa et al. | |
| 2013/0301542 A1* | 11/2013 | Krishnamurthy | H04W 52/50 370/329 |
| 2014/0308953 A1* | 10/2014 | Park | H04W 76/026 455/436 |
| 2016/0057708 A1* | 2/2016 | Siomina | H04W 52/243 455/452.2 |

FOREIGN PATENT DOCUMENTS

| | | |
|---|---|---|
| JP | 2011-151499 A | 8/2011 |
| WO | 2012/073371 A1 | 6/2012 |
| WO | 2014/119246 A1 | 8/2014 |

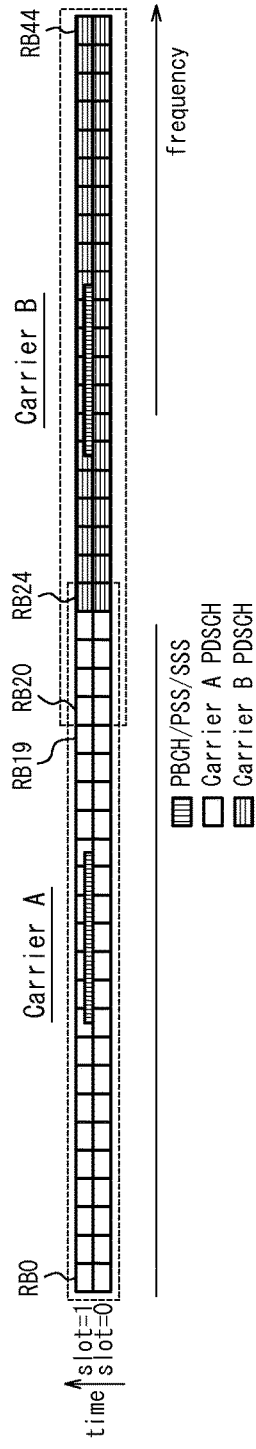
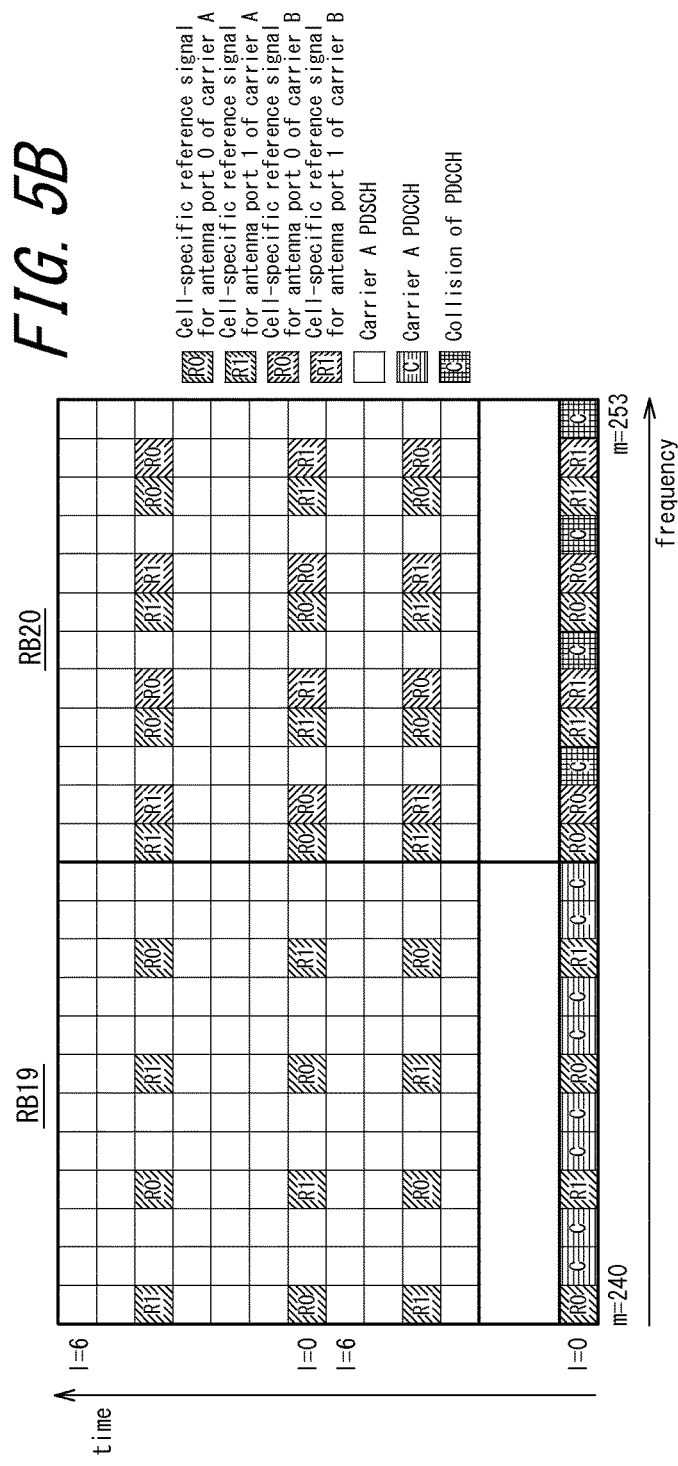

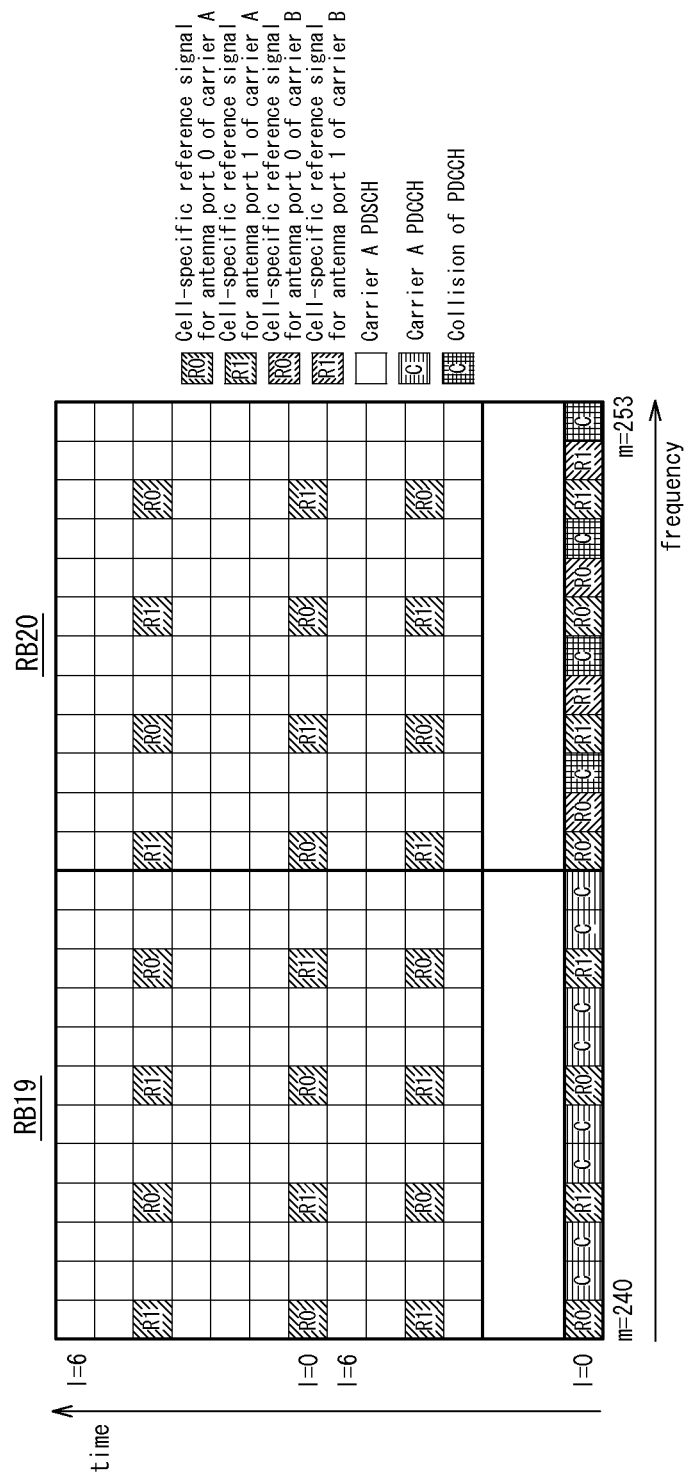

COMMUNICATION SYSTEM, BASE STATION, AND COMMUNICATION CONTROL METHOD

CROSS REFERENCE TO RELATED APPLICATION

This application is a National Phase of International Application Number PCT/JP2014/002857, filed May 29, 2014, and claims priority to and the benefit of Japanese Patent Application No. 2013-113174 filed on May 29, 2013 and Japanese Patent Application No. 2013-113118 filed on May 29, 2013, the entire contents of which are incorporated herein by reference.

TECHNICAL FIELD

This disclosure relates to a communication system, a base station, and a communication control method.

BACKGROUND

In a communication scheme such as TD-LTE, for example, a carrier wave (a carrier) used for transmission may take a frequency bandwidth (hereinafter, referred to as a bandwidth) at 1.4 MHz, 3 MHz, 5 MHz, 10 MHz, and 20 MHz (see NPL 1 and NPL 2, etc.). The number of resource blocks (RBs) included in each of the bandwidths is 6 RBs, 15 RBs, 25 RBs, 50 RBs, and 100 RBs, respectively. A communication speed increases in proportion to the bandwidth. However, the TD-LTE cannot use, in a sharing manner, a frequency band and the like assigned to another communication scheme (a digital cordless telephone and the like) currently existing. Therefore, within a range of an available frequency band, a bandwidth is determined appropriately.

CITATION LIST

Non-Patent Literatures

NPL 1: 3GPP TS 36.101 Ver. 9.0.0 "LTE; Evolved Universal Terrestrial Radio Access (U-UTRA); User Equipment (UE) radio transmission and reception"

NPL 2: 3GPP TS 36.211 Ver. 9.0.0 "LTE; Evolved Universal Terrestrial Radio Access (U-UTRA); Physical channels and modulation"

SUMMARY

Technical Problem

A bandwidth of 9 MHz from 1884.5 MHz to 1893.5 MHz (hereinafter, referred to as a 9 MHz band or a second frequency band) is assigned as a frequency band for a public PHS. For example, when the communication system employing the TD-LTE is used in the 9 MHz band, it may be considered to assign a bandwidth of 5 MHz (hereinafter, referred also as a first frequency bandwidth) to one carrier so as to fit within the 9 MHz band. However, a communication speed with the bandwidth of 5 MHz is slower than that of the bandwidth of 10 MHz. Also, since only 5 MHz in the bandwidth of 9 MHz is used, utilization of a communication resource is inefficient.

On the other hand, when two carriers both taking 5 MHz are arranged in succession in the 9 MHz band, the carriers exceed the bandwidth of 9 MHz, overlapping with an adjacent band of another system (a band of the digital cordless telephone). In particular, although an effective band is 9 MHz when the two carriers both taking 5 MHz (an effective band is 4.5 MHz) are arranged in succession, leaked power overlaps the frequency band of the digital cordless telephone, causing radio wave interference.

In consideration of the above problem, it could be helpful to provide a communication system, a base station, and a communication control method those being capable of, in the communication scheme such as the TD-LTE and the like, increasing a communication speed by securing the bandwidth of the carrier, and preventing the radio wave interference with another system by keeping the carrier within the frequency band (for example, the 9 MHz band) assigned to the communication scheme.

Solution to Problem

In order to solve the above problem, a communication system according to the disclosure herein is a communication system having a plurality of base stations for carrying out radio communication by arranging a plurality of carriers each taking a first frequency bandwidth in a second frequency band, the second frequency band being predetermined and to be exceeded by the carriers arranged in succession, wherein the communication system arranges the carriers in the second frequency band in such a manner that each of the carriers has an overlapping portion overlapping with each other, and a first base station for using one of the carriers having the overlapping portion preferentially uses, over a second base station using another carrier, a radio resource of a part of the overlapping portion in assigning user data.

The communication system according to the disclosure herein, wherein the first base station and the second base station, in assigning a reference signal, use radio resources arranged at different positions in the overlapping portion.

The communication system according to the disclosure herein, wherein the second base station refrains from transmitting the reference signal by using a radio resource to which the first base station preferentially assigns the user data.

The communication system according to the disclosure herein, wherein the second base station, in assigning a predetermined control signal, uses a radio resource arranged at a position different from a control channel of the first base station.

A communication system according to the disclosure herein is a communication system having a plurality of base stations for carrying out radio communication by arranging a plurality of carriers each taking a first frequency bandwidth in a second frequency band, the second frequency band being predetermined and to be exceeded by the carriers arranged in succession, wherein the communication system arranges the carriers in the second frequency band in such a manner that each of the carriers has an overlapping portion overlapping with each other, and a first base station using one of the carriers having the overlapping portion and a second base station for using another carrier, based on MCS (Modulation and Coding Scheme) of a mobile station, control assignment of a radio resource in the overlapping portion.

The communication system according to the disclosure herein, wherein the first base station and the second base station, when the MCS of the mobile station connected thereto is equal to or greater than a predetermined first threshold, lower a priority of assignment of the radio resource in the overlapping portion to the mobile station.

The communication system according to the disclosure herein, wherein, when the MCS of the mobile station connected to the first base station is smaller than a predetermined second threshold, by using a radio resource where user data of the first base station and a reference signal of the second base station collide with each other, the first base station refrains from transmitting the user data and the second base station transmits the reference signal.

The communication system according to the disclosure herein, wherein, when the MCS of the mobile station connected to the first base station is equal to or greater than a predetermined second threshold, by using a radio resource where user data of the first base station and a reference signal of the second base station collide with each other, the first base station transmits the user data and the second base station refrains from transmitting the reference signal.

A base station according to the disclosure herein is a base station of a communication system having a plurality of base stations for carrying out radio communication by arranging a plurality of carriers each taking a first frequency bandwidth in a second frequency band, the second frequency band being predetermined and to be exceeded by the carriers arranged in succession, wherein the base station using one of the carriers in the second frequency band arranged in a manner having an overlapping portion overlapping with each other, and in assigning user data, specifying a portion of a radio resource in the overlapping portion preferentially used by each of the base stations.

The base station according to the disclosure herein, wherein, in assigning a reference signal, the base stations use radio resources arranged at different positions in the overlapping portion.

The base station according to the disclosure herein, refraining from transmitting the reference signal in a portion preferentially used for the assignment of the user data by another base station using another carrier.

The base station according to the disclosure herein, in assigning a predetermined control signal, using a radio resource arranged at a position different from a control channel of another base station using another carrier.

A base station according to the disclosure herein is a base station of a communication system having a plurality of base stations for carrying out radio communication by arranging a plurality of carriers each taking a first frequency bandwidth in a second frequency band, the second frequency band being predetermined and to be exceeded by the carriers arranged in succession, wherein the base station using one of the carriers in the second frequency band arranged in a manner having an overlapping portion overlapping with each other, and controlling assignment of a radio resource in the overlapping portion based on MCS (Modulation and Coding Scheme) of a mobile station.

The base station according to the disclosure herein, when the MCS of the mobile station connected to the base station of its own is equal to or greater than a predetermined first threshold, lowering a priority of assignment of the radio resource in the overlapping portion to the mobile station.

The base station according to the disclosure herein, by using a radio resource where a reference signal of another base station using another carrier and user data of the base station of its own collide with each other, transmitting the user data when the MCS of the mobile station connected to the base station of its own is equal to or greater than a predetermined second threshold, and refraining from transmitting the user data when the MCS of the mobile station connected to the base station of its own is smaller than the predetermined second threshold.

The base station according to the disclosure herein, by using a radio resource where user data of another base station using another carrier and a reference signal of the base station of its own collide with each other, refraining from transmitting the reference signal when an MCS of a mobile station connected to the another base station is equal to or greater than a predetermined second threshold, and transmitting the reference signal when the MCS of the mobile station connected to the another base station is smaller than the predetermined second threshold.

A communication control method according to the disclosure herein is a communication control method of a communication system having a plurality of base stations for carrying out radio communication by arranging a plurality of carriers each taking a first frequency bandwidth in a second frequency band, the second frequency band being predetermined and to be exceeded by the carriers arranged in succession, wherein the communication system arranges the carriers in the second frequency band in such a manner that each of the carriers has an overlapping portion overlapping with each other, and a first base station for using one of the carriers having the overlapping portion preferentially uses, over a second base station using another carrier, a radio resource of a part of the overlapping portion in assigning user data.

The communication control method according to the disclosure herein, wherein the first base station and the second base station, in assigning a reference signal, uses radio resources arranged at different positions in the overlapping portion.

The communication control method according to the disclosure herein, wherein the second base station refrains from transmitting the reference signal by using a radio resource to which the first base station preferentially assigns the user data.

The communication control method according to the disclosure herein, wherein the second base station, in assigning a predetermined control signal, uses a radio resource arranged at a position different from a control channel of the first base station.

A communication control method according to the disclosure herein is a communication control method of a communication system having a plurality of base stations for carrying out radio communication by arranging a plurality of carriers each taking a first frequency bandwidth in a second frequency band, the second frequency band being predetermined and to be exceeded by the carriers arranged in succession, wherein the communication system arranges the carriers in the second frequency band in such a manner that each of the carriers has an overlapping portion overlapping with each other, and a first base station for using one of the carriers having the overlapping portion and a second base station for using another carrier, based on an MCS (Modulation and Coding Scheme) of a mobile station, control assignment of a radio resource in the overlapping portion.

The communication control method according to the disclosure herein, wherein the first base station and the second base station, when the MCS of the mobile station connected thereto is equal to or greater than a predetermined first threshold, lower a priority of assignment of a radio resource in the overlapping portion to the mobile station.

The communication control method according to the disclosure herein wherein, when the MCS of the mobile station connected to the first base station is smaller than a predetermined second threshold, by using a radio resource where user data of the first base station and a reference signal of the second base station collide with each other, the first base station refrains from transmitting the user data and the second base station transmits the reference signal.

The communication control method according to the disclosure herein wherein, when the MCS of the mobile station connected to the first base station is equal to or greater than a predetermined second threshold, by using a radio resource where user data of the first base station and a reference signal of the second base station collide with each other, the first base station transmits the user data and the second base station refrains from transmitting the reference signal.

Advantageous Effect

The communication system, the base station, and the communication control method those according to the disclosure herein are capable of, in a communication scheme such as TD-LTE or the like, increasing a communication speed by securing the bandwidth of the carrier, and preventing radio wave interference with another system by keeping the carrier within a frequency band (for example, a 9 MHz band) assigned to the communication scheme.

BRIEF DESCRIPTION OF THE DRAWINGS

In the accompanying drawings:

FIGS. 5A and 5B are diagrams illustrating an example of assignment of radio resources for a downlink according to the embodiment 1;

FIG. 8 is a diagram illustrating an example of assignment of the radio resources for the downlink according to an exemplary variation of the embodiment 1;

DETAILED DESCRIPTION

Hereinafter, embodiments of the disclosure herein will be described.

Embodiment 1

Figure 1:
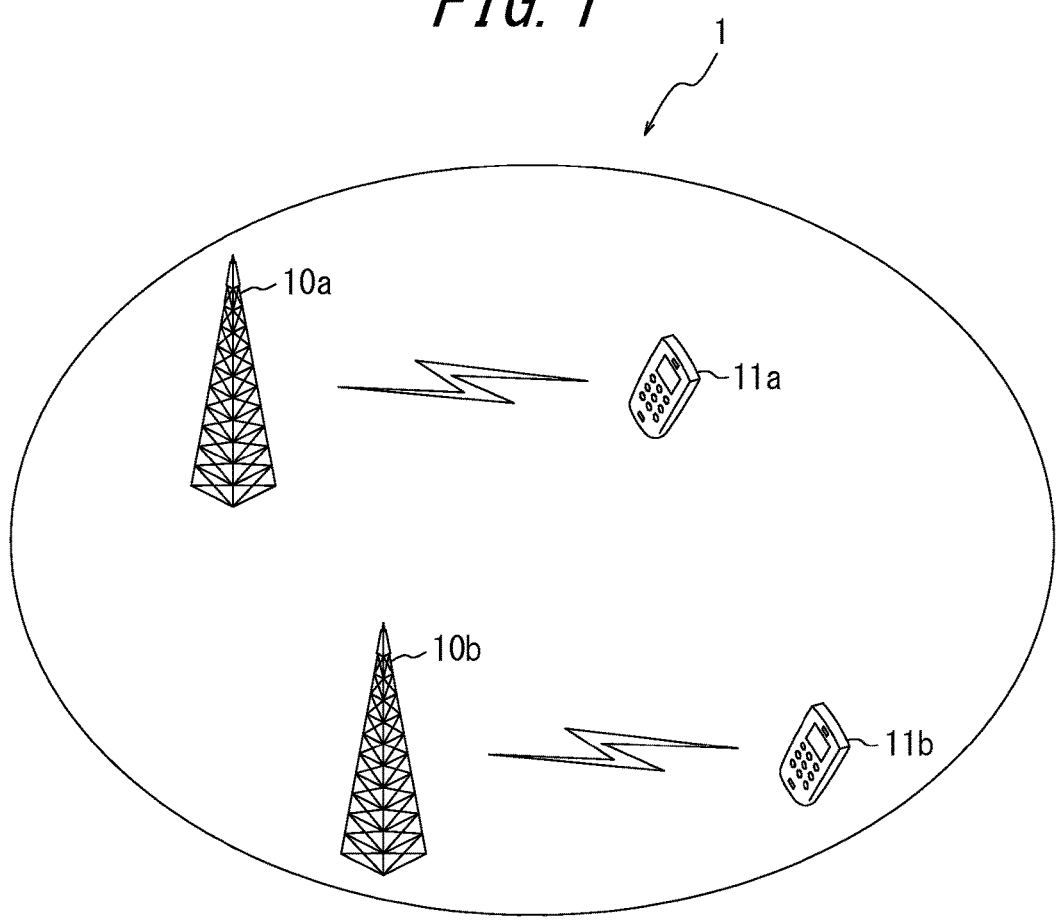
FIG. 1 is a schematic diagram of a communication system according to an embodiment 1.

FIG. 1 is a schematic diagram of a communication system 1 according to an embodiment 1. The communication system 1 according to the embodiment 1 includes a plurality of communication apparatuses. The communication system 1, as illustrated in FIG. 1, for example, includes a communication apparatus 10a (a base station 10a) and a communication apparatus 10b (a base station 10b), to which a communication apparatus 11a (a mobile station 11a) and a communication apparatus 11b (a mobile station 11b) are connected, respectively. Although in FIG. 1 two base stations and two mobile stations are illustrated, the disclosure herein is not limited thereto but may include more than two base stations and more than two mobile stations. Also, in the communication system 1 the base station 10a and the base station 10b may communicate with each other.

The communication system 1 employs a communication scheme such as TD-LTE, LIE, or the like. Hereinafter, the present embodiment assumes that the communication system 1 employs TD-LTE as the communication scheme. Also, the communication system 1 carries out radio communication by arranging, in a 9 MHz band (a second frequency band), two carriers of 5 MHz (an effective band: 4.5 MHz) (a first frequency bandwidth). Hereinafter, these two carriers arranged in the second frequency band are referred to as a carrier A and a carrier B. For example, the base station 10a and the communication apparatus 11a communicate with each other by using the carrier A, and the base station 10b and the communication apparatus 11b communicate with each other by using the carrier B.

Figure 2A:
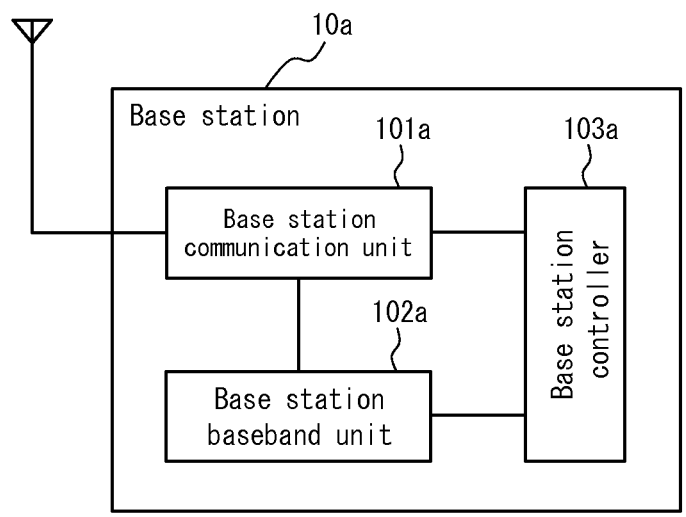
FIGS. 2A and 2B are block diagrams of base stations according to the embodiment 1.
Figure 2B:
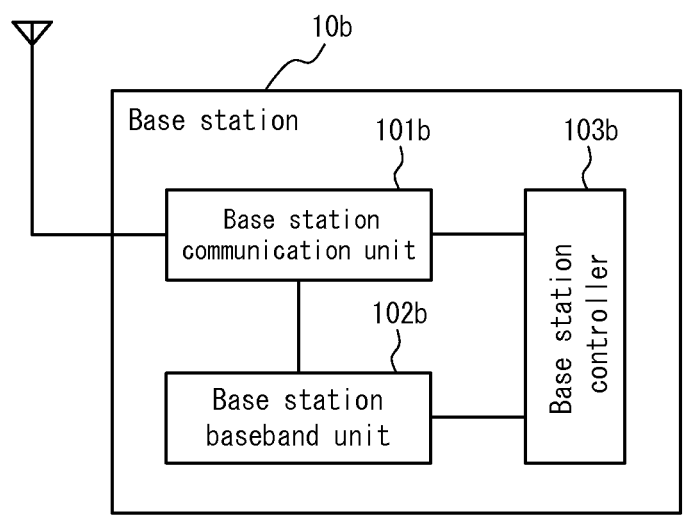

FIG. 2A and FIG. 2B are a block diagram of the base station 10a and a block diagram of the base station 10b according to the present embodiment, respectively. As illustrated in FIG. 2A, the base station 10a includes a base station communication unit 101a, a base station baseband unit 102a, and a base station controller 103a. The base station communication unit 101a and the base station baseband unit 102a are connected to the base station controller 103a.

The base station communication unit 101a exchanges radio signals (data) with the mobile station 11a via an antenna. The base station communication unit 101a carries out amplification with low noise, down-conversion and the like on the radio signal being received (a received signal) and transmits a signal thus obtained to the base station baseband unit 102a. Also, the base station communication unit 101a carries out up-conversion, amplification and the like on a baseband signal received from the base station baseband unit 102a and thereby generates a radio signal (a transmission signal). Then, the base station communication unit 101a, via the antenna, transmits the radio signal to the mobile station 11a.

The base station baseband unit 102a carries out AD conversion, fast Fourier transform and the like on the signal received from the base station communication unit 101a and thereby demodulates the signal and extracts the baseband signal. Then, the base station baseband unit 102a transmits the baseband signal to the base station controller 103a. Also, the base station baseband unit 102a carries out inverse Fourier transform, DA conversion and the like on the baseband signal generated by the base station controller 103a and thereby modulates the baseband signal. The baseband signal thus modulated is transmitted to the base station communication unit 101a. Further, the base station baseband unit 102a extracts CQI (Channel Quality Indicator) indicative of channel quality from the radio signal (a CQI report) received from the mobile station 11a. Then, the base station baseband unit 102a transmits the CQI thus extracted to the base station controller 103a.

The base station controller 113a controls and manages the entire base station 10a including each functional block thereof. The base station controller 103a may be constituted by using software executed by any appropriate processor such as CPU (Central Processing Unit), or a dedicated processor (for example, DSP (Digital Signal Processor)) specialized for each operation.

The base station controller 103a, in order to substantialize the radio communication between the base station 10a and the mobile station 11a, uses the carrier A of the first frequency bandwidth. In particular, the base station controller 103a assigns a used downlink radio resource and a used uplink radio resource those partially constituting the carrier A to the mobile station 11a (and other mobile stations connected to the base station 10a). The used downlink radio resource is a radio resource used for downlink communication (downlink) from the base station to the mobile station, and the used uplink radio resource is a radio resource used for uplink communication (uplink) from the mobile station to the base station. The base station controller 103a, by using the used downlink radio resource and the used uplink radio resource those being assigned, communicates with the mobile station 11a. Also, the base station controller 103a transmits information on the used downlink radio resource and the used uplink radio resource those being assigned, to the base station 11a (and other mobile stations connected to the base station 10a) via the base station communication unit 101a.

Assignment of the radio resource to each mobile station connected to the base station 10a is carried out by using the CQI extracted by the base station baseband unit 102a according to scheduling algorithm such as, for example, PF (Proportional Fair). The PF is a scheduling method of assigning each RB to a base station with large instant SINR with respect to a mean SINR (Signal to Interference plus Noise power Ratio). Also, the base station controller 103a determines the most efficient MCS (Modulation and Coding Scheme) that satisfies a predetermined BLER (Block Error Rate) in the radio resource being assigned. An MCS is represented by a value between 0 and 18 indicative of a combination of a data modulation scheme used for the transmission of the radio signal and a channel coding rate. As the value of the MCS is greater, the efficiency is better, and coding strength becomes lower. The assignment of the radio resource according to a type of the radio signal transmitted by the base station 10a will be described later with reference to FIG. 5 and FIG. 6.

As illustrated in FIG. 2B, the base station 10b has a configuration the same as that of the base station 10a. A base station communication unit 101b and a base station baseband unit 102b operate in the same manners as the base station communication unit 101a and the base station baseband unit 102a, respectively.

A base station controller 103b of the base station 10b, in order to substantialize the radio communication between the base station 10b and the mobile station 11b, uses the carrier B of the first frequency bandwidth. In particular, the base station controller 103b assigns a used downlink radio resource and a used uplink radio resource those partially constituting the carrier B to the mobile station 11b (and other mobile stations connected to the base station 10b). The base station controller 103b, by using the used downlink radio resource and the used uplink radio resource those being assigned, communicates with the mobile station 11b. Also, the base station controller 103b transmits information on the used downlink radio resource and the used uplink radio resource those being assigned, to the mobile station 11b (and other mobile stations connected to the base station 10b) via the base station communication unit 101b.

Assignment of the radio resource to each mobile station connected to the base station 10b is carried out by using the CQI extracted by the base station baseband unit 102b according to the scheduling algorithm such as, for example, the PF Also, the base station controller 103b determines the most efficient MCS that satisfies the predetermined BLER in the radio resource being assigned. The assignment of the radio resource according to a type of the radio signal transmitted by the base station 10b will be described later with reference to FIG. 5 and FIG. 6.

Figure 3A:
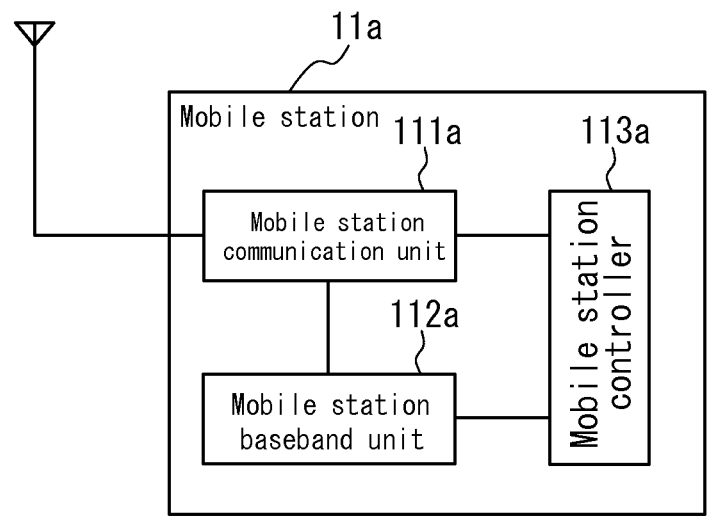
FIGS. 3A and 3B are block diagrams of mobile stations according to the embodiment 1.
Figure 3B:
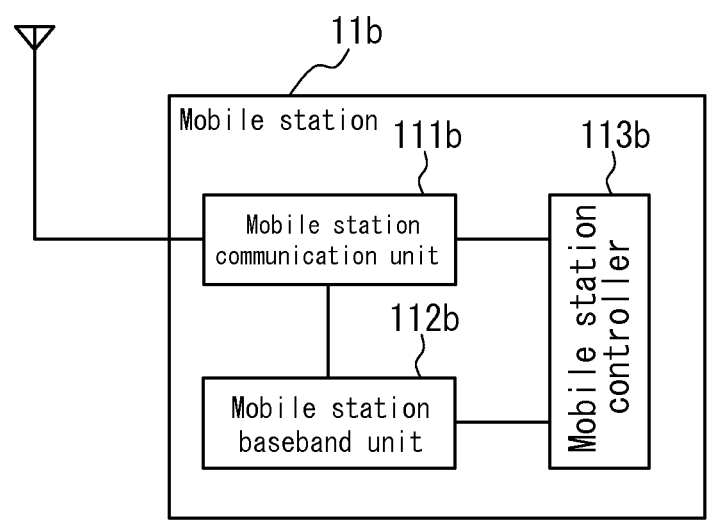

FIG. 3A and FIG. 3B illustrate a block diagram of the mobile station 11a and a block diagram of the mobile station 11b according to the embodiment 1, respectively. As illustrated in FIG. 3A, the mobile station 11a includes a mobile station communication unit 11a, a mobile station baseband unit 112a, and a mobile station controller 113a. The mobile station communication unit 111a and the mobile station baseband unit 112a are connected to the mobile station controller 113a.

The mobile station communication unit 111a exchanges the radio signal (the data) via an antenna. The mobile station communication unit 111a carries out the amplification with low noise, the down-conversion and the like on the radio signal being received (the received signal) and transmits a signal thus obtained to the mobile station baseband unit 112a. Also, the mobile station communication unit 111a carries out the up-conversion, the amplification and the like on a baseband signal received from the mobile station baseband unit 112a and thus generates a radio signal (a transmission signal). Then, the mobile station communication unit 111a, via the antenna, transmits the radio signal to the base station 10a.

The mobile station baseband unit 112a carries out the AD conversion and the fast Fourier transform on the signal received from the mobile station communication unit 111a and thereby demodulates the signal and extracts the baseband signal. Then, the mobile station baseband unit 112a transmits the baseband signal to the mobile station controller 113a. Also, the mobile station baseband unit 112a carries out the inverse Fourier transform and the DA conversion on the baseband signal generated by the mobile station controller 113a and thereby modulates the baseband signal. The baseband signal thus modulated is transmitted to the mobile station communication unit 111a.

The mobile station controller 113a controls and manages the entire mobile station 11a including each functional block thereof. The mobile station controller 113a may be constituted by using software executed by any appropriate processor such as the CPU (Central Processing Unit), or the dedicated processor (for example, DSP (Digital Signal Processor)) specialized for each operation.

The mobile station controller 113a, based on the assignment information on the used downlink radio resource and the used uplink radio resource in the carrier A received from the base station 10a, determines a radio resource to be used, the modulation scheme, and the coding rate. Then, the mobile station controller 113a, by using the radio resource, the modulation scheme, and the coding rate thus determined, carries out the radio communication with the base station 10a through the mobile station communication unit 111a and the mobile station baseband unit 112a. Also, the base station controller 113a, at predetermined intervals, generates the CQI report serving as information associated with the channel quality. Preferably, the mobile station controller 113a, when generating the CQI report, in order to eliminate influence by the channel quality in an overlapping portion, uses Higher Layer-configured subband feedback (Mode 3-0 and mode 3-1) or UE-selected subband feedback (Mode 2-0 and Mode 2-2).

As illustrated in FIG. 3B, the mobile station 11b has a configuration the same as that of the mobile station 11a. The mobile station communication unit 111b and the mobile station baseband unit 112b operate in the same manners as the mobile station communication unit 111a and the mobile station baseband unit 112a, respectively.

The mobile station controller 113b of the mobile station 11b, based on the assignment information on the used downlink radio resource and the used uplink radio resource in the carrier B received from the base station 10b, determines the radio resource to be used, the modulation scheme, and the coding rate. Then, the mobile station controller 113b, by using the radio resource, the modulation scheme, and the coding rate thus determined, carries out the radio communication with the base station 10b through the mobile station communication unit 111b and the mobile station baseband unit 112b. Also, the base station controller 113b, at predetermined intervals, generates the CQI report serving as the information associated with the channel quality. Preferably, the mobile station controller 113b, when generating the CQI report, in order to eliminate influence by the channel quality in the overlapping portion, uses Higher Layer-configured subband feedback (Mode 3-0 and mode 3-1) or UE-selected subband feedback (Mode 2-0 and Mode 2-2).

Figure 4:
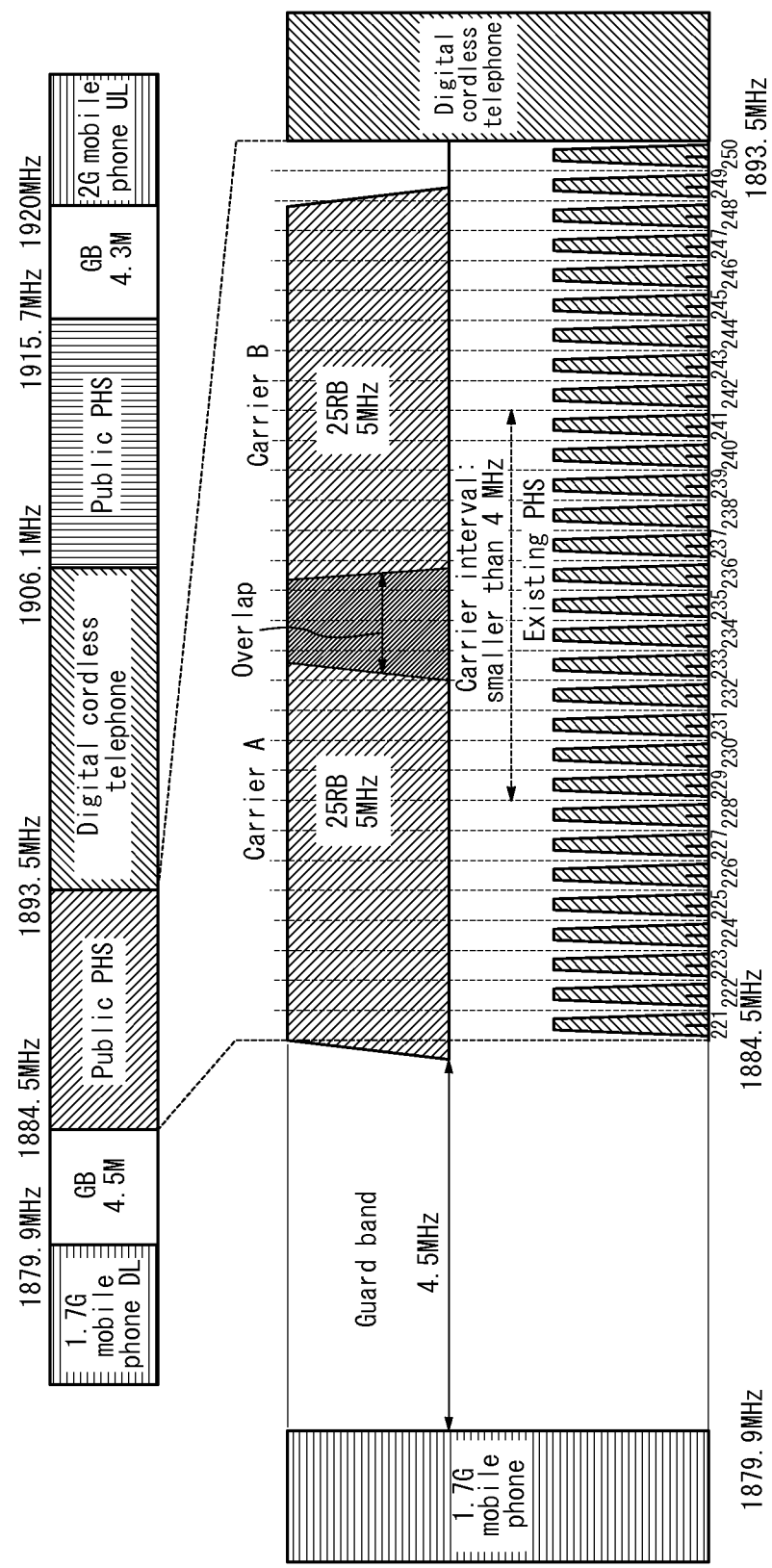
FIG. 4 is a schematic diagram of an arrangement of carriers according to the embodiment 1.

Here, when the carrier A and the carrier B of the first frequency bandwidth (5 MHz) are arranged in succession in the second frequency band (the 9 MHz band), a total bandwidth is 10 MHz which exceeds 9 MHz. As such, the communication system 1 according to the embodiment 1 assigns, in the 9 MHz band, the carrier A and the carrier B in such a manner that the carrier A and the carrier B partially overlap with each other. FIG. 4 illustrates a schematic diagram in which the carrier A and the carrier B partially overlap with each other. As illustrated in FIG. 4, in bands in the vicinity of the 9 MHz band, a 1.7 G cellular band is assigned to a range under 1879.9 MHz, a guard-band is assigned to a range of 1879.9 MHz to 1884.5 MHz, and a public PHS band (the 9 MHz band) is assigned to a range of 1884.5 MHz to 1893.5 MHz. Also, a digital cordless telephone band is assigned to a range of 1893.5 MHz to 1906.1 MHz, the public PHS band is assigned to a range of 1906.1 MHz to 1915.7 MHz, the guard-band is assigned to a range of 1915.7 MHz to 1920 MHz, and a 2G mobile phone band is assigned to a range from 1920 MHz. As illustrated in FIG. 4, the communication system 1 arranges the carrier A and the carrier B in the 9 MHz band in such a manner that the carrier A and the carrier B partially overlap with each other. In particular, since a center frequency of the carrier is set in 0.1 MHz increments based on an LTE standard (see NPL 1), a great majority of the frequency band of the carrier A is arranged between 1884.5 MHz and 1889.5 MHz and a great majority of the frequency band of the carrier B is arranged between 1885.5 MHz and 1893.5 MHz. The carrier A and the carrier B overlap in, for example, a 1 MHz band between 1888.5 MHz and 1889.5 MHz. Hereinafter, this band will be referred to as the overlapping portion (or an overlapping band). When the base station 10a and the base station 10b transmit the radio signals those collide with each other in the overlapping portion, the mobile station cannot receive the radio signal appropriately due to interference. Therefore, it is preferable that the base stations use different radio resources in the overlapping portion in transmitting the radio signals.

Figure 6:
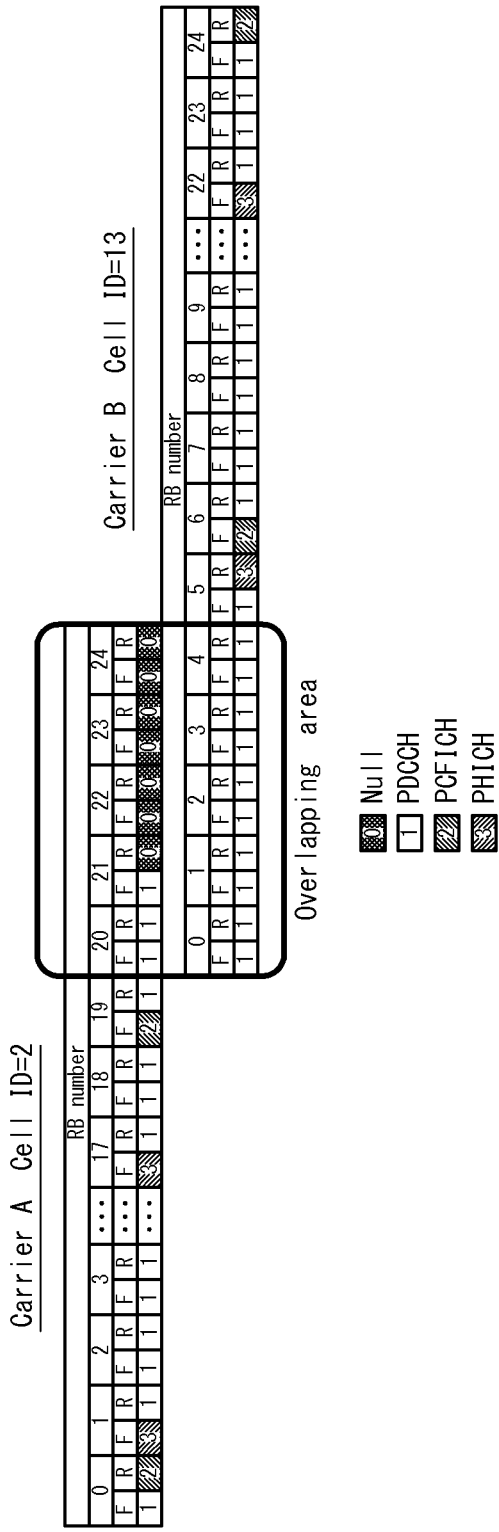
FIG. 6 is a diagram illustrating an example of assignment of the radio resources for an OFDM symbol at the head in FIG. 5.

Referring to FIG. 5 and FIG. 6, next, the assignment of the radio resource according to the type of the radio signal transmitted by the base station will be described. FIG. 5 are diagrams illustrating an example of the assignment of the radio resource for the downlink according to the embodiment 1. Schematically, the base station 10a and the base station 10b carry out the radio communication by specifying the radio resources preferentially used by each of the base stations for the transmission of the radio signals. FIG. 5A illustrates a state in which the carrier A and the carrier B, both having 25 RBs per slot, are arranged such that 5 RBs of each of the carriers overlap with each other, forming a band including 45 RBs in total. Note that in FIG. 5A one subframe made up of two slots is illustrated in a time axis direction, and the RBs are numbered from 0 to 44 as index numbers. Also in FIG. 5A, for the sake of description, a control information range having a control channel such as PDCCH (Physical Downlink Control Channel) and the like assigned thereto is omitted, illustrating a user data range alone having a shared channel such as PDSCH (Physical Downlink Shared Channel) and the like assigned thereto. The PDCCH is a channel for transmitting control information associated with connection between the base station and the mobile station. Also, the PDSCH is a channel for transmitting the user data associated with download from the base station to the mobile station and the like. Hereinafter, the carrier A is assigned to a low-frequency side, and the carrier B is assigned to a high-frequency side.

PBCH (Physical Broadcast Channel), PSS (Primary Synchronization Signal), and SSS (Secondary Synchronization Signal), based on the LTE standard, are assigned to a band for 6 RBs at the center frequency of the carrier (see NPL 2). Accordingly, the PBCH, the PSS, and the SSS transmitted by the base station 10a and the base station 10b are not assigned to the overlapping portion, eliminating the necessity for consideration of collision between the carriers.

Next, the PDSCH will be described. The base station 10a, in order to reduce the influence of the collision in the overlapping portion, carries out scheduling according to distributed RB assignment. Here, since a 24th RB does not perform frequency hopping, the base station 10a, in assigning the PDSCH, uses 0th to 23th RBs without using the 24th RB. On the other hand, the base station 10b, for the assignment of the PDSCH, uses the 24th to 44th RBs and performs scheduling according to localized RB assignment.

As described above, for the assignment of the PDSCH for the transmission of the user data, since the base station 10a preferentially uses a portion of the overlapping portion, i.e., the 20th RB to the 23th RB, the collision of the PDSCH in the overlapping portion may be prevented.

FIG. 5B is a diagram illustrating details of the 19th RB and the 20th RB in FIG. 5A. One RB includes twelve sub-carriers arranged in a frequency axis direction and one slot made up of seven OFDM symbols arranged in a time axis direction. Also, in the subframe made up of two slots, the first three symbols are used as a control information area having PDCCH and the like assigned thereto, and the remaining 11 symbols are used as a user data area having the PDSCH and the like assigned thereto.

Next, a cell-specific reference signal (hereinafter, referred to as a reference signal) will be described. The reference signal is used for channel equalization of the control channel and transmitted to each antenna port of the carrier. FIG. 5B illustrates an example of assignment of the reference signals corresponding to an antenna port 0 and an antenna port 1 of the base station 10a and base station 10b. Based on the LTE standard, the reference signal is assigned to two REs (Resource Elements) at predetermined positions for every six sub-carriers for each antenna port (see the NPL 2). Since the 19th RB is not included in the overlapping portion, reference signals respectively corresponding to the antenna port 0 and the antenna port 1 of the carrier A are assigned thereto. On the other hand, since the 20th RB is in an important portion, the reference signal of the base station 10*b* is further assigned thereto. Here, the base station 10*b* transmits the reference signal by using a radio resource at a position different from the radio resource used by the base station 10*a*, thereby avoiding collision. In particular, the base station 10*a* and the base station 10*b* adjust cell IDs between the carriers and thus transmit the reference signals by using different sub-carriers in one RB. That is, the base station 10*a* and the base station 10*b* transmit the respective reference signals at different positions in the overlapping portion. Here, the cell IDs are identifiers allowing identification of the base stations 10*a* and base station 10*b* and may be individually changed by the base station controller 103*a* and the base station controller 103*b* in an appropriate manner. The base station controller 103*a* and the base station controller 103*b*, based on the cell IDs, determine initial offset of the reference signal, i.e., an assignment start position in the frequency axis direction.

As described above, the base station 10*a* and the base station 10*b* transmit the reference signals by using the radio resources at different positions and thus may prevent the collision of the reference signals in the overlapping portion.

Next, the PDCCH will be described. The PDCCH is assigned to, in a top symbol of the sub-frame, one REG (Resource Element Group) made up of four REs. One RB, except an RE having the reference signal assigned thereto, includes two REGs: an REG made up of four sub-carriers on the low frequency side (hereinafter, referred to as a first half REG) and an REG made up of four sub-carriers on the high frequency side (hereinafter, referred to as a second half REG). Also, the PDCCH includes four CCEs (Control Channel Elements) that use nine REGs and thus includes thirty six REGs in total. Here, the base station 10*a*, as described later with reference to FIG. 6, assigns PCFICH (Physical Control Format Indicator Channel) and PHICH (Physical HARQ Indicator Channel) avoiding the overlapping portion and then assigns, to a radio resource having neither PCFICH nor PHICH assigned thereto, PDCCH by employing interleaving in order from the low frequency side. The PCFICH is a channel used to transmit information indicative of the number of symbols used as a control signal area in the sub-frame. Also, the PHICH is a channel used to transmit transmission acknowledgment information of the radio signal transmitted by the mobile station. Based on the LTE standard, the PCFICH includes four REGs, and the PHICH includes three REGs (see the NPL 2). The base station 10*a*, therefore, assigns the PDCCH to forty-three REGs from the low frequency side, i.e., to a range from the first half REG of the 0th RB to the first half REG of the 21st RB. As illustrated in FIG. 5B, the 19th RB is not located in the overlapping portion and thus has the PDCCH of the base station 10*a* assigned thereto. On the other hand, the 20th RB is located in the overlapping portion and thus has the PDCCH and, further, the reference signal assigned thereto. Therefore, the PDCCH and the reference signal, or the PDCCH and the PDCCH collide with each other.

Here, since the PDCCH is generally redundant and has high coding intensity and, also, the base station 10*a* assigns the PDCCH to the radio resource in order from the low frequency side, even when there is some collision in a portion of the overlapping portion (in the 20th RB and the first half REG of the 21st RB), the mobile station is highly likely to be able to demodulate the signal. Therefore, by using the RE where the PDCCH and the reference signal collide with each other, the reference signal is preferentially transmitted and the PDCCH is not transmitted. Note that, by using the RE where the PDCCH and the PDCCH collide with each other, both the base station 10*a* and the base station 10*b* transmit the PDCCH.

As described above, the base station 10*a* and the base station 10*b* transmit the reference signal alone by using the RE where the PDCCH and the reference signal collide with each other, thereby preventing the reference signal from interfering the PDCCH.

Next, the PCFICH and the PHICH will be described. In FIG. 6, the top OFDM symbols in each REG in the carrier A and the carrier B are illustrated. In the figure, "front" and "rear" represent the first half REG and the second half REG, respectively. Based on the LTE standard, the base station assigns the PCFICH and the PHICH to positions where the carrier bandwidth is divided into four equal portions and three equal portions, respectively (see the NPL 2). Here, the initial offset of the PCFICH and the PHICH may be changed by adjusting the cell ID of the carrier. FIG. 6 illustrates an example of the assignment of the PCFICH and the PHICH when the carrier A has a cell ID=2 and the carrier B has a cell ID=13, avoiding the overlapping portion. That is, the base station 10*a* and base station 10*b* adjust the sell IDs and assign the PCFICH and the PHICH avoiding the overlapping portion.

Or, the base station 10*a* may assign the PCFICH and the PHICH avoiding the overlapping portion, and the base station 10*b* may assign the PCFICH and the PHICH avoiding the PDCCH of the base station 10*a* in the overlapping portion. In particular, since the base station 10*a* assigns the PDCCH from the first half REG of the 0th RB to the first half REG of the 21st RB, REGs from the second half REG of the 21st RB to the second half REG of the 24th RB are Null. Accordingly, the base station 10*b* assigns the PCFICH and the PHICH avoiding the radio resource (i.e., from the first half REG of the 20th RB to the first half REG of the 21st RB) having the PDCCH of the base station 10 assigned thereto in the overlapping portion.

As described above, the base station 10*b*, in assigning the PCFICH and the PHICH used for the transmission of the predetermined control signal, uses the radio resource at a position different from a position of the control channel (the PDCCH, the PCFICH, and the PHICH) of the base station 10*a*. Thereby, the PCFICH and the PHICH transmitted by the base station 10*a* and the base station 10*b* may be prevented from colliding with each other.

Next, operations in the communication system 1 according to the embodiment 1 will be described with reference to a flowchart illustrated in FIG. 7.

Figure 7A:
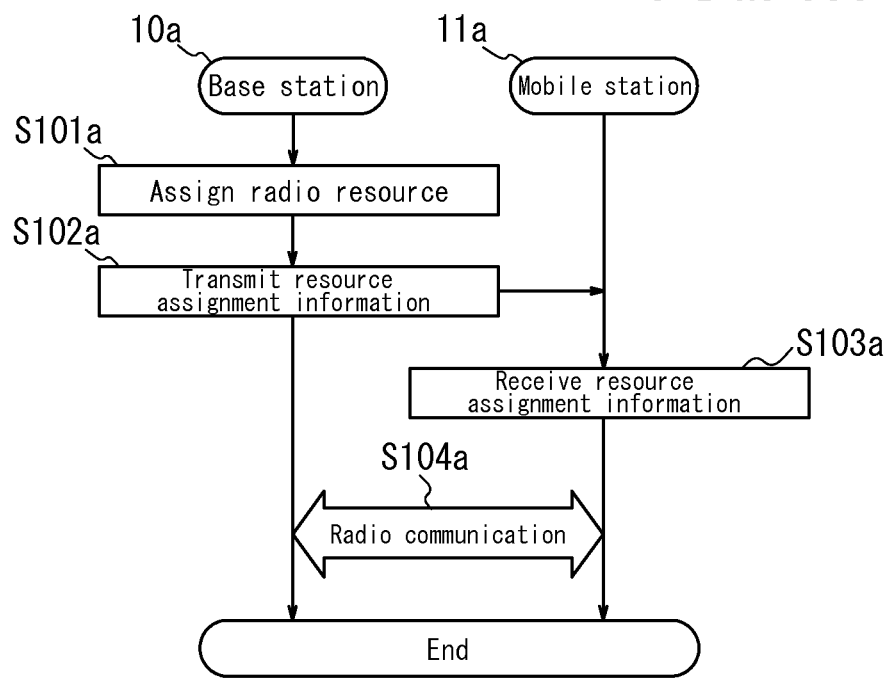
FIGS. 7A and 7B are flowcharts illustrating operations in a communication system according to the embodiment 1.

FIG. 7A illustrates operations of the base station 10*a* and the mobile station 11*a* in the communication system 1 according to the embodiment 1.

First, the base station controller 113*a* assigns the used downlink radio resource and the used uplink radio resource in a portion of the carrier A to the mobile station 11*a* (and other mobile stations connected to the base station 10*a*) (step S101*a*). Preferably, the used downlink radio resource is assigned according to the distributed RB assignment.

At this time, the base station controller 103*a*, in the downlink, assigns the PDSCH to the user data area from the 0th RB to the 23rd RB. Also, the base station controller 103*a* assigns the reference signal to the sub-carrier different from that of the base station 10*b*. Further, the base station controller 103a adjusts the cell ID and assigns the PCFICH and the PHICH to the control information area avoiding the overlapping portion. Then, the base station controller 103a, by employing interleaving, assigns the PDCCH to the radio resource having neither the PCFICH nor the PHICH assigned thereto in order from the low frequency side.

Next, the base station controller 103a transmits the assignment information of the used downlink radio resource and the used uplink radio resource to the mobile station 11a (and other mobile stations connected to the base station 10a) via the base station communication unit 101a (step S102a). The mobile station 11a receives the assignment information (step S103a).

Subsequently, the base station controller 103a, through the base station communication unit 101a and the base station baseband unit 102a, communicates with the mobile station 11a (step S104a).

At this time, the base station controller 103a, in the downlink, refrains from transmitting the PDCCH by using the RE where the PDCCH of the base station of its own and the reference signal of the base station 10b collide with each other.

Figure 7B:
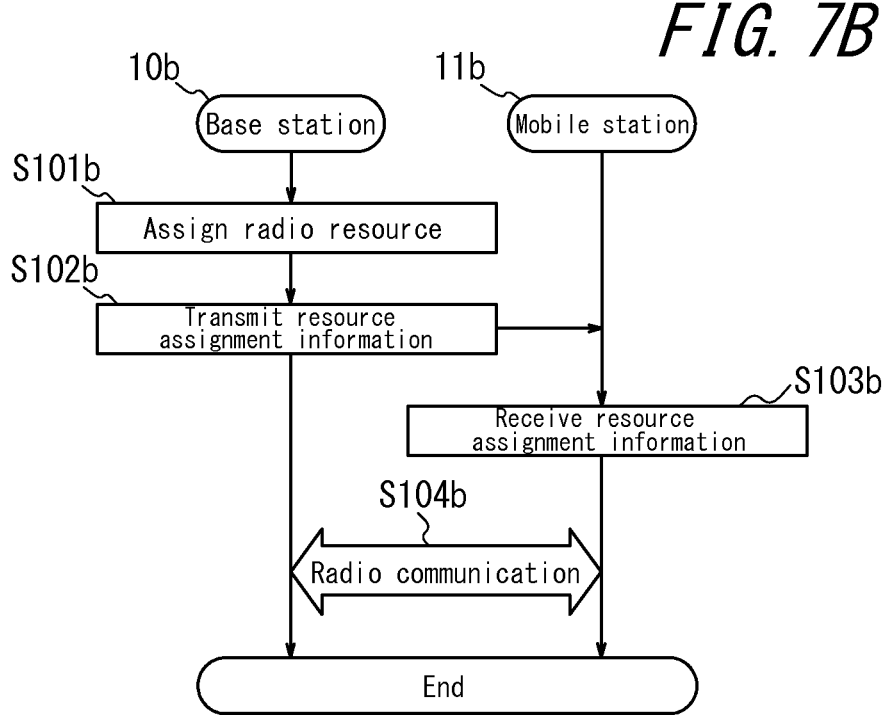

FIG. 7B illustrates operations of the base station 10b and the mobile station 11b. First, the base station controller 103a assigns the used downlink radio resource and the used uplink radio resource in a portion of the carrier B to the mobile station 11b (and other mobile stations connected to the base station 10b) (step S101b).

At this time, the base station controller 103b, in the downlink, assigns the PDSCH to the user data area from the 24th RB to the 44th RB according to the localized RB assignment. Also, the base station controller 103b assigns the reference signal to the sub-carrier different from that of the base station 10a. Further, the base station controller 103b adjusts the cell ID and assigns the PCFICH and the PHICH to the control information area avoiding the overlapping portion or the control channel (the PDCCH) of the base station 10a. Then, the base station controller 103b assigns the PDCCH to the radio resource having neither the PCFICH nor the PHICH assigned thereto.

Next, the base station controller 103b transmits the assignment information of the used downlink radio resource and the used uplink radio resource to the mobile station 11b (and other mobile stations connected to the base station 10b) via the base station communication unit 101b (step S102b). The mobile station 11b receives the assignment information (step S103b).

Subsequently, the base station controller 103b, through the base station communication unit 101b and the base station baseband unit 102b, communicates with the mobile station 11b (step S104b).

According to the communication system 1 of the embodiment 1, as described above, in the communication scheme such as the TD-LTE and the like, one communication apparatus (the base station 10a), for the assignment of the PDSCH, preferentially uses some radio resource in the overlapping portion over the other communication apparatus (the base station 10b). Thereby, the bandwidth of the carrier is secured and a communication speed is increased. Further, the carrier may be kept within the frequency band assigned by the communication scheme and prevented from interfering with a radio wave of another system. Also, the base station 10a and the base station 10b, for the assignment of the reference signals, use the radio resources in the overlapping portion those do not cause the collision, i.e., transmit the reference signal by using different sub-carriers. Therefore, the reference signals are prevented from interfering with each other, and communication stability may be improved. Further, the base station 10b, for the assignment of the PCFICH and the PHICH, uses the radio resource that does not cause the collision with the control channel of the base station 10a, i.e., the PDCCH, the PCFICH, and the PHICH. Therefore, the PCFICH and the PHICH may be prevented from colliding with the control channel of the base station 10a, and the communication stability may be improved.

Exemplary Variation of Embodiment 1

Next, an exemplary variation of the embodiment 1 will be described. The base station 10b according to the exemplary variation, in assigning the reference signal in the overlapping portion, uses the radio resource in the control signal area at a position different from that of the base station 10a and refrains from using the radio resource in the user data area.

FIG. 8 is a diagram illustrating the 19th RB and the 20th RB of FIG. 5A in detail. The 19th RB is not included in the overlapping portion in a manner similarly to the embodiment 1. In the 20th RB included in the overlapping portion, the reference signal of the base station 10b is assigned to the top symbol. On the other hand, the reference signal of the base station 10b is not assigned to the user data area, and more PDSCH of the base station 10a than that of the embodiment 1 are assigned to the user data area.

According to the communication system 1 of the exemplary variation of the embodiment 1, as described above, the base station 10b, in assigning the reference signal in the overlapping portion, uses the radio resource in the control signal area at a position different from that of the base station 10a. Therefore, the communication stability may be improved. Also, since the base station 10b refrains from assigning the reference signal to the user data area in the overlapping portion, the base station 10a assigns more PDSCH to the user data area. Thereby, the user data may be transmitted more efficiently.

Embodiment 2

Next, an embodiment 2 will be described. Components the same as those of the embodiment 1 are denoted by the same reference numerals and descriptions thereof will be omitted. Schematically, the communication system 1 according to the embodiment 2 changes a method of assigning the radio resource based on the MCS of the mobile station connected to the base station.

Figure 9A:
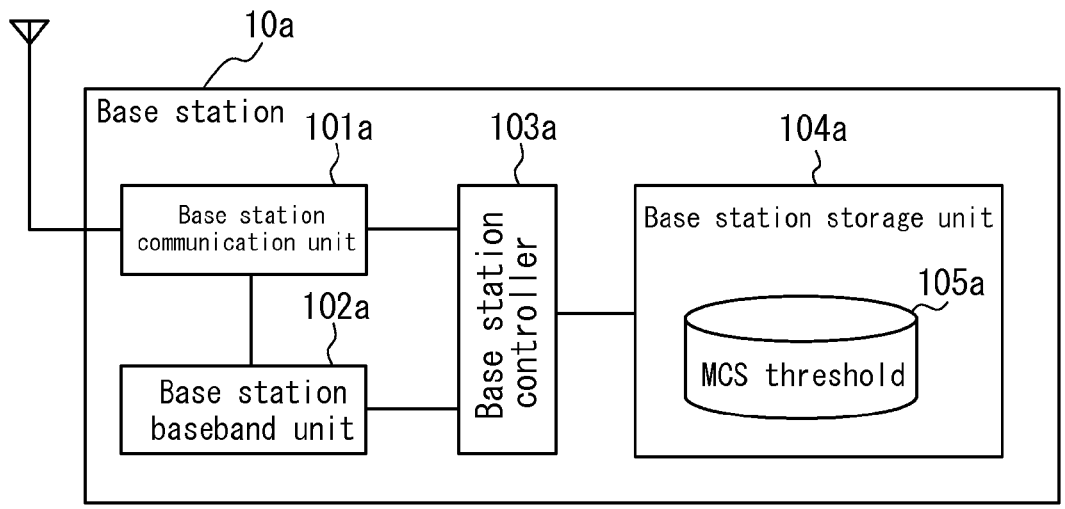
FIGS. 9A and 9B are block diagrams of base stations according to an embodiment 2.

FIG. 9 are block diagrams illustrating the base station 10a and the base station 10b according to the embodiment 2. As illustrated in FIG. 9A, the base station 10a includes the base station communication unit 101a, the base station baseband unit 102a, the base station controller 103a, and a base station storage unit 104a. Since the base station communication unit 101a and the base station baseband unit 102a are the same as those of the embodiment 1, descriptions thereof will be omitted.

The base station storage unit 104a preliminarily stores an MCS threshold 105a. The MCS threshold 105a includes an MCS threshold (a first threshold) used by the base station controller 103a for the assignment of the radio resource to each mobile station connected to the base station 10a and another MCS threshold (a second threshold) associated with a collision RB ratio at which BLER characteristics of the PDSCH for one mobile station does not degraded. Note that the second threshold may be preliminarily calculated by simulation.

The base station controller 103a, based on the MCS of the mobile station 11a, assigns the radio resource to the mobile station 11a. In particular, the base station controller 103a, in assigning the RB to the mobile station, when the MCS of the mobile station 11a is equal to or over the first threshold, lowers the priority of assignment of the mobile station 11a to the RB in the overlapped portion. For example, in the following formula: allocation priority [RB]=instantaneous SINR [RB]/mean SINR [RB]+a [RB, MCS], when the MCS is equal to or greater than the first threshold (for example, 28), α=−1 is satisfied and, when the MCS is smaller than the first threshold, α=0 is satisfied. For the RB outside the overlapping portion, α=0 is always satisfied.

Also, the base station controller 103a determines whether to transmit some of the PDSCH assigned to the overlapping portion, based on the MCS of the mobile station 11a. In particular, the base station controller 103a, when the MCS of the mobile station 11a is equal to or greater than the second threshold, determines to transmit the PDSCH by using an RE where the PDSCH collides with the reference signal of the base station 10b in the user data area of the overlapping portion and notifies the base station 10b accordingly. On the other hand, the base station controller 103a, when the MCS of the base station 11a is smaller than the second threshold, determines not to transmit the PDSCH by using the RE and notifies the base station 10b accordingly.

Figure 9B:
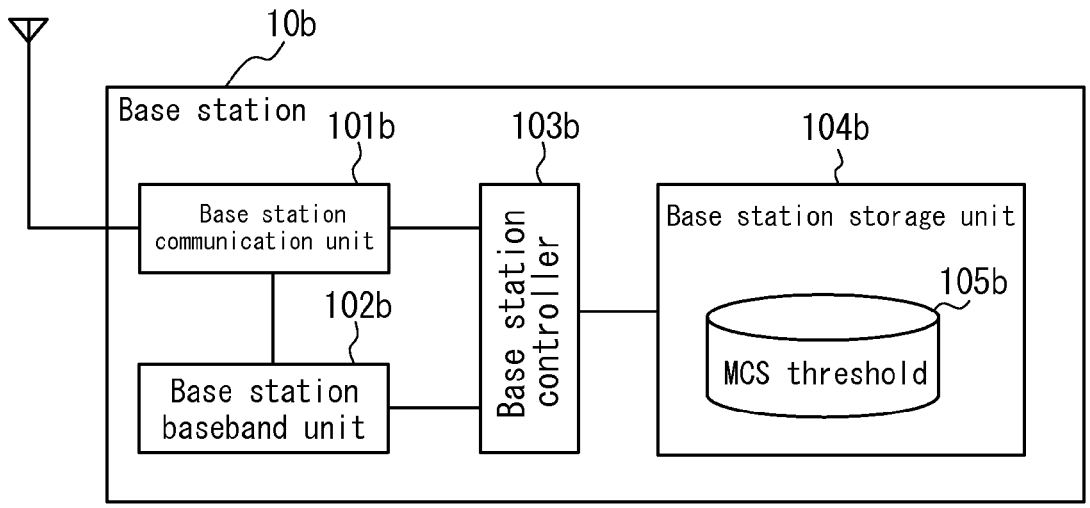

As illustrated in FIG. 9B, the base station 10b includes the base station communication unit 101b, the base station baseband unit 102b, the base station controller 103b, and a base station storage unit 104b. Since the base station communication unit 101b and the base station baseband unit 102b are the same as those of the embodiment 1, descriptions thereof will be omitted.

The base station storage unit 104b preliminarily stores an MCS threshold 105b. The MCS threshold 105b includes an MCS threshold (a first threshold) used by the base station controller 103b for the assignment of the radio resource to each mobile station connected to the base station 10b.

The base station controller 103b, based on the MCS of the mobile station 11b, assigns the radio resource to the mobile station 11b. In particular, the base station controller 103b, in assigning the RB to the mobile station, when the MCS of the mobile station 11b is equal to or greater than the first threshold, lowers the priority of assignment of the mobile station 11b to the RB in the overlapped portion. For example, in the following formula: allocation priority [RB]=instantaneous SINR [RB]/mean SINR [RB]+a [RB, MCS], when the MCS is equal to or greater than the first threshold (for example, 28), α=−1 is satisfied and, when the MCS is smaller than the first threshold, α=0 is satisfied. For the RB outside the overlapping portion, α=0 is always satisfied.

Also, the base station controller 103b, based on the notification from the base station 10a, determines whether to transmit the reference signal in the user data area of the overlapping portion. In particular, the base station controller 103b, when receiving the notification that the base station 10a transmits the PDSCH by using the RE where the PDSCH collides with the reference signal of the base station 10b in the user data area of the overlapping portion, determines not to transmit the reference signal by using the RE. On the other hand, when the base station controller 103a receives notification that the base station 10a does not transmit the PDSCH by using the RE, determines to transmit the reference signal by using the RE.

Figure 10:
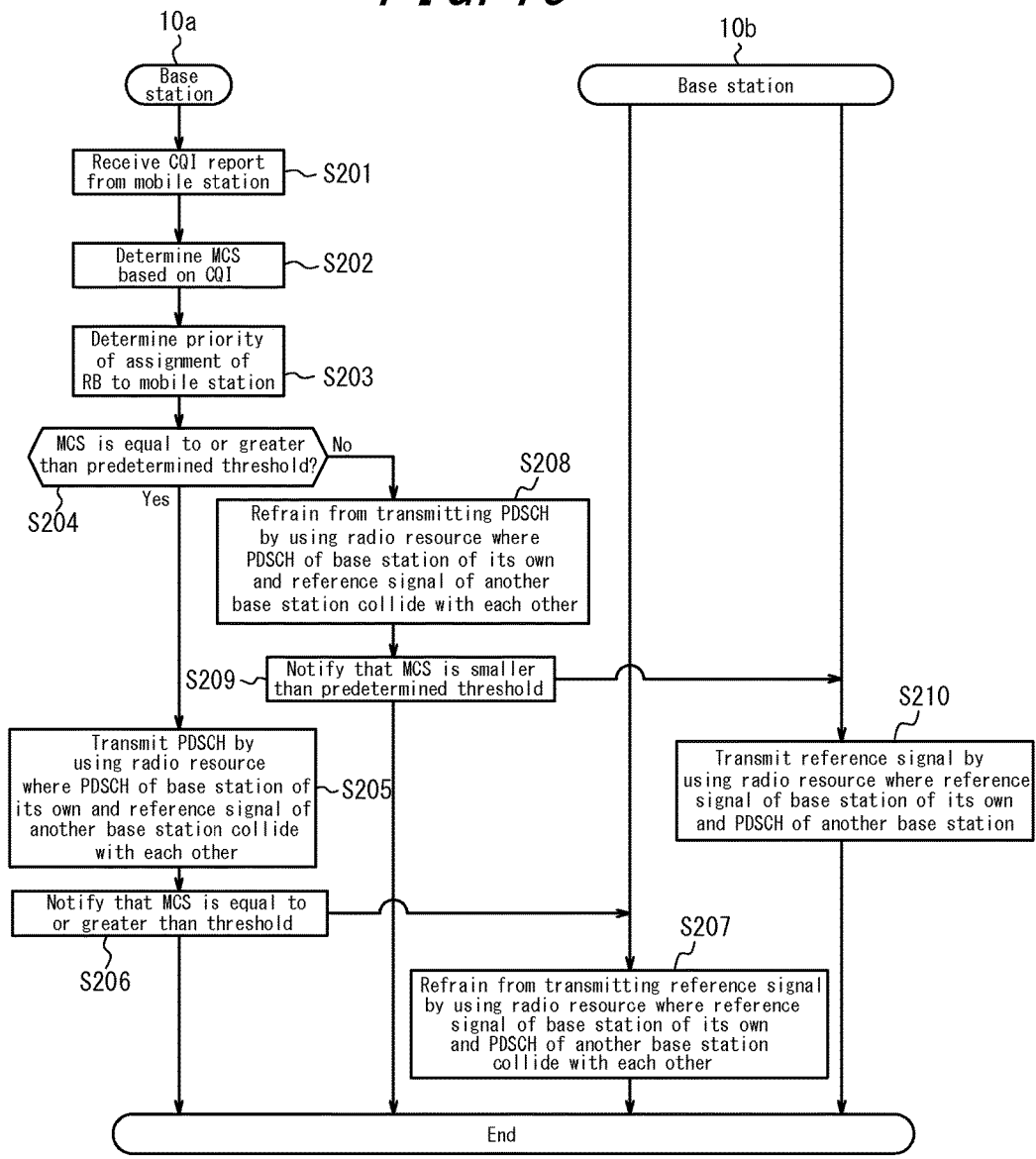
FIG. 10 is a flowchart illustrating an operation in a communication system according to the embodiment 2.

FIG. 10 illustrates, in the communication system 1 according to the embodiment 2, an operation of the assignment of the radio resource by the base station bases on the MCS of the mobile station. First, the base station 10a receives the CQI report from the mobile station 11a (step S201).

Next, the base station 10a, based on the CQI extracted from the CQI report, determines the MCS of the mobile station 11a (step S202).

Next, the base station 10a determines the priority of assignment of the RB to the mobile station 11a. In particular, the base station 10a, when the MCS determined at step S202 is equal to or greater than the first threshold, lowers the priority of assignment of the RB in the overlapping portion.

Then, the base station 10a determines whether the MCS determined at step S202 is equal to or greater than the second threshold (step S204).

When the MCS is equal to or greater than the second threshold (Yes at step S204), the base station 10a determines to transmit the PDSCH by using the RE where the PDSCH collides with the reference signal of the base station 10b in the user data area of the overlapping portion (step S205).

Subsequently, the base station 10a notifies the base station 10b of the transmission of the PDSCH by using the RE (step S206).

The base station 10b, upon reception of the notification from the base station 10a, determines not to transmit the reference signal by using the RE (step S207).

On the other hand, when the MCS is smaller than the second threshold (No at step S204), the base station 10a determines not to transmit the PDSCH by using the RE where the PDSCH collides with the reference signal of the base station 10b in the user data area of the overlapping portion (step S208).

Next, the base station 10a notifies the base station 10b that the base station 10a does not transmit the PDSCH by using the RE (step S209).

The base station 10b, upon reception of the notification from the base station 10a, determines to transmit the reference signal by using the RE (step S210).

According to the communication system 1 of the embodiment 2, as described above, when the MCS of the mobile station connected to the base station is high, the priority of assignment of the mobile station to the RE in the overlapping portion is lowered. Thereby, the probability of the interference between the radio signals is reduced, and the communication stability may be improved. Also, the base station 10a and the base station 10b, based on the MCS of the mobile station 11a, determine which one of the base stations will use the RE where the PDSCH (the user data) of the base station 10a and the reference signal of the base station 10b collide with each other in the user data area of the overlapping portion. That is, the base station 10a preferentially transmits the PDSCH when the MCS is large, and the base station 10b preferentially transmits the reference signal when the MCS is small. Thereby, the communication stability of the entire communication system 1 may be improved.

Note that, although in the above embodiments the communication system 1 uses the second frequency band of 9 MHz, the disclosure herein is not limited thereto. The second frequency band may be either under or over 9 MHz. In this case, according to the bandwidth of the second frequency band, the bandwidth of the first frequency band and the bandwidth of the overlapping portion of a plurality of carriers are appropriately changed.

Also, although in the above embodiment 2, when the MCS of the mobile station connected to the base station of its own is equal to or greater than the second threshold, the priority of assignment of the RB in the overlapping portion is lowered, the priority of assignment of the RB outside the overlapping portion may be raised.

Although the present disclosure has been described based on the figures and the embodiments, it is to be understood that various changes and modifications may be implemented based on the present disclosure by those who are ordinarily skilled in the art. Accordingly, such changes and modifications are included in the scope of the present disclosure. For example, functions and the like included in each means, each step and the like may be rearranged without logical inconsistency, so as to combine a plurality of means or steps together or to divide them.

REFERENCE SIGNS LIST

| | |
|---|---|
| 1 | communication system |
| 10a, 10b | base station (communication apparatus) |
| 11a, 11b | mobile station (communication apparatus) |
| 101a, 101b | base station communication unit |
| 102a, 102b | base station baseband unit |
| 103a, 103b | base station controller |
| 104a, 104b | base station storage unit |
| 105a, 105b | MCS threshold |
| 111a, 111b | mobile station communication unit |
| 112a, 112b | mobile station baseband unit |
| 113a, 113b | mobile station controller |

The invention claimed is:

1. A communication system, comprising:
a plurality of base stations for carrying out radio communication by arranging a plurality of carriers within a second frequency band, each carrier taking a first frequency bandwidth, the second frequency band being a predetermined cellular phone band,
wherein
when the second frequency band is exceeded by the first frequency bandwidths of the corresponding carriers arranged in succession,
the communication system arranges the carriers within the second frequency band, in such a manner that each of the carriers has an overlapping portion overlapping with each other,
a first base station for using one of the carriers having the overlapping portion preferentially uses, over a second base station using another carrier, a radio resource of a part of the overlapping portion in assigning user data,
the first base station and the second base station, in assigning a reference signal, use radio resources arranged at different positions in the overlapping portion, wherein the radio resource in the overlapping portion for the reference signal of the first base station is different from the radio resource in the overlapping portion for the reference signal of the second base station, and
the first base station refrains from transmitting control information at a radio resource where the control information of the first base station and the reference signal of the second base station may collide with each other.

2. The communication system according to claim 1, wherein the second base station refrains from transmitting the reference signal by using the radio resource to which the first base station preferentially assigns the user data.

3. The communication system according to claim 1, wherein the second base station, in assigning a predetermined control signal, uses a radio resource arranged at a position different from a control channel of the first base station.

4. A communication system, comprising:
a plurality of base stations for carrying out radio communication by arranging a plurality of carriers within a second frequency band, each carrier taking a first frequency bandwidth, the second frequency band being a predetermined cellular phone band,
wherein
when the second frequency band is exceeded by the first frequency bandwidths of the corresponding carriers arranged in succession,
the communication system arranges the carriers within the second frequency band in such a manner that each of the carriers has an overlapping portion overlapping with each other, and
a first base station using one of the carriers having the overlapping portion and a second base station for using another carrier, based on MCS (Modulation and Coding Scheme) of a mobile station, control assignment of a radio resource in the overlapping portion,
wherein
when the MCS of the mobile station connected to the first base station is smaller than a predetermined threshold, by using a radio resource where user data of the first base station and a reference signal of the second base station collide with each other, the first base station refrains from transmitting the user data and the second base station transmits the reference signal, and
when the MCS of the mobile station connected to the first base station is equal to or greater than a predetermined threshold, by using the radio resource where the user data of the first base station and the reference signal of the second base station collide with each other, the first base station transmits the user data and the second base station refrains from transmitting the reference signal.

5. The communication system according to claim 4, wherein the first base station and the second base station, when the MCS of the mobile station connected thereto is equal to or greater than another predetermined threshold, lower a priority of assignment of the radio resource in the overlapping portion to the mobile station.

6. A base station of a communication system having a plurality of base stations for carrying out radio communication wherein the base station comprises: a processor, a controller and a baseband unit for
arranging a plurality of carriers within a
second frequency band, each carrier taking a first frequency bandwidth, the second frequency band being a predetermined cellular phone band,
wherein
when the second frequency band is exceeded by the first frequency bandwidths of the corresponding carriers arranged in succession, the base station
uses one of the carriers in the second frequency band arranged in a manner having an overlapping portion overlapping with each other,
in assigning user data, specifies a portion of a radio resource in the overlapping portion preferentially used by each of the base stations, in assigning a reference signal, uses the radio resource, in the overlapping portion, arranged at a position different from the radio resource, in the overlapping portion, used by another base station of the base stations, wherein the radio resource in the overlapping portion for the reference signal of the base station is different from the radio resource in the overlapping portion for the reference signal of the another base station, and the base station refrains from transmitting control information at a radio resource where the control information of the base station and the reference signal of the another base station may collide with each other.

7. The base station according to claim 6, wherein the base station refrains from transmitting the reference signal in the portion preferentially used for assignment of the user data by another base station using another carrier.

8. The base station according to claim 6, wherein the base stations, in assigning a predetermined control signal, uses a radio resource arranged at a position different from a control channel of another base station using another carrier.

9. A base station of a communication system having a plurality of base stations for carrying out radio communication wherein the base station comprises: a processor, a controller and a baseband unit for arranging a plurality of carriers within a second frequency band, each carrier taking a first frequency bandwidth, the second frequency band being a predetermined cellular phone band, wherein when the second frequency band is exceeded by the first frequency bandwidths of the corresponding carriers arranged in succession, the base station uses one of the carriers in the second frequency band arranged in a manner having an overlapping portion overlapping with each other, and controls assignment of a radio resource in the overlapping portion based on MCS (Modulation and Coding Scheme) of a mobile station~ the base station, by using a radio resource where a reference signal of another base station using another carrier and user data of the base station of its own collide with each other, transmits the user data when the MCS of the mobile station connected to the base station of its own is equal to or greater than a predetermined threshold, and refrains from transmitting the user data when the MCS of the mobile station connected to the base station of its own is smaller than the predetermined threshold, and the base station, by using a radio resource where user data of another base station using another carrier and a reference signal of the base station of its own collide with each other, refrains from transmitting the reference signal when an MCS of a mobile station connected to the another base station is equal to or greater than a predetermined threshold, and transmits the reference signal when the MCS of the mobile station connected to the another base station is smaller than the predetermined threshold.

10. The base station according to claim 9, when the MCS of the mobile station connected to the base station of its own is equal to or greater than another predetermined threshold, lowering a priority of assignment of the radio resource in the overlapping portion to the mobile station.

11. A communication control method of a communication system having a plurality of base stations for carrying out radio communication by arranging a plurality of carriers within a second frequency band, each carrier taking a first frequency bandwidth, the second frequency band being a predetermined cellular phone band, wherein when the second frequency band is exceeded by the first frequency bandwidths of the corresponding carriers arranged in succession, the communication system arranges the carriers in the second frequency band in such a manner that each of the carriers has an overlapping portion overlapping with each other, a first base station for using one of the carriers having the overlapping portion preferentially uses, over a second base station using another carrier, a radio resource of a part of the overlapping portion in assigning user data, the first base station and the second base station, in assigning a reference signal, use radio resources arranged at different positions in the overlapping portion, wherein the radio resource in the overlapping portion for the reference signal of the first base station is different from the radio resource in the overlapping portion for the reference signal of the second base station, and the first base station refrains from transmitting control information at a radio resource where the control information of the first base station and the reference signal of the second base station may collide with each other.

12. The communication control method according to claim 11, wherein the second base station refrains from transmitting the reference signal by using the radio resource to which the first base station preferentially assigns the user data.

13. The communication control method according to claim 11, wherein the second base station, in assigning a predetermined control signal, uses a radio resource arranged at a position different from a control channel of the first base station.

14. A communication control method of a communication system having a plurality of base stations for carrying out radio communication by arranging a plurality of carriers within a second frequency band, each carrier taking a first frequency bandwidth, the second frequency band being a predetermined cellular phone a PHS band, wherein when the second frequency band is exceeded by the first frequency bandwidths of the corresponding carriers arranged in succession, the communication system arranges the carriers in the second frequency band in such a manner that each of the carriers has an overlapping portion overlapping with each other, and a first base station for using one of the carriers having the overlapping portion and a second base station for using another carrier, based on an MCS (Modulation and Coding Scheme) of a mobile station, control assignment of a radio resource in the overlapping portion, when the MCS of the mobile station connected to the first base station is smaller than a predetermined threshold, by using a radio resource where user data of the first base station and a reference signal of the second base station collide with each other, the first base station refrains from transmitting the user data and the second base station transmits the reference signal, and when the MCS of the mobile station connected to the first base station is equal to or greater than the predetermined threshold, by using the radio resource where the user data of the first base station and the reference signal of the second base station collide with each other, the first base station transmits the user data and the second base station refrains from transmitting the reference signal.

15. The communication control method according to claim 14, wherein the first base station and the second base station, when the MCS of the mobile station connected thereto is equal to or greater than another predetermined threshold, lower a priority of assignment of a radio resource in the overlapping portion to the mobile station.

* * * * *